W. L. BLISS.
SYSTEM OF ELECTRICAL REGULATION.
APPLICATION FILED APR. 17, 1914. RENEWED JAN. 12, 1920.
1,331,234. Patented Feb. 17, 1920.
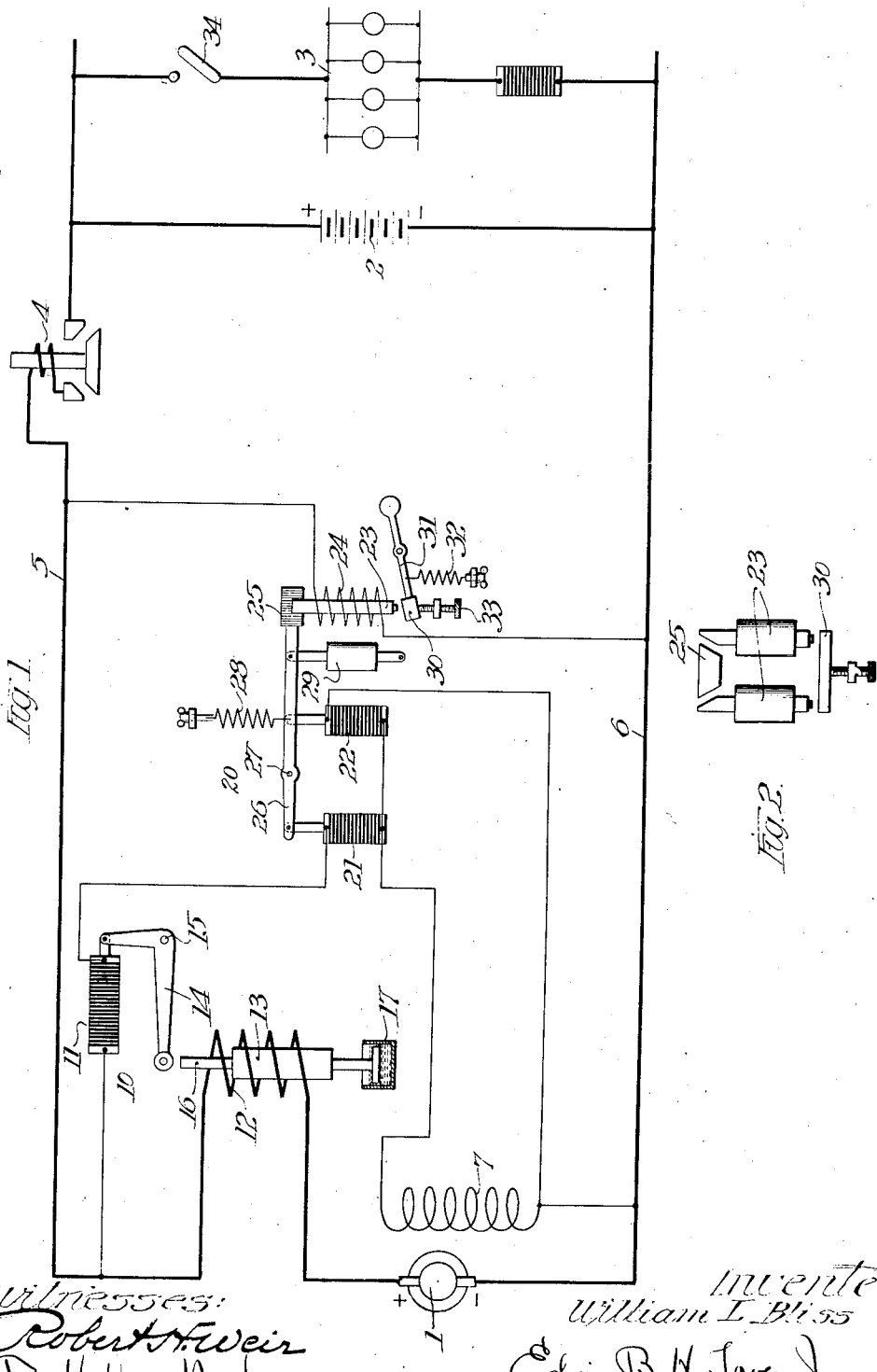

UNITED STATES PATENT OFFICE.

WILLIAM L. BLISS, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

SYSTEM OF ELECTRICAL REGULATION.

1,331,234.      Specification of Letters Patent.      Patented Feb. 17, 1920.

Application filed April 17, 1914, Serial No. 832,468. Renewed January 12, 1920. Serial No. 350,941.

*To all whom it may concern:*

Be it known that I, WILLIAM L. BLISS, a citizen of the United States, residing at Niagara Falls, in the county of Niagara and State of New York, have invented new and useful Improvements in Systems of Electrical Regulation, of which the following is a full, clear, concise, and exact description, reference being had to the accompanying drawing, forming a part of this specification.

This invention relates to a system of electrical regulation.

The invention is especially applicable to railway car and automobile battery and lighting systems.

In systems of this type a variable speed generator operates to furnish current intermittently to supply the lamps and to charge the battery. The lamps are connected to the battery and are supplied with current therefrom when the generator is not running.

One of the objects of this invention is to provide an improved regulator which will regulate the voltage of the generator to send full charging current to the battery until a predetermined voltage across the battery is attained and which will then hold the generator voltage at a value equal to or slightly above the battery voltage.

Another object is to provide an improved and efficient regulator which will cause the generator voltage to build up quickly.

A still further object is to provide an improved regulator which will be sensitive for regulation only when regulation is required.

In the drawings:—

Figure 1 is a diagram of a system embodying the invention.

Fig. 2 is a fragmentary detail view illustrating the cores and the armatures of the voltage controlled magnet.

The system comprises a generator having an armature 1, a storage battery 2, lamps or an equivalent load 3, an automatic switch 4 and mains 5 and 6 for connecting the generator to the battery and the lamps.

The generator is provided with a field winding 7 which furnishes the field excitation. The current through this winding can be regulated by either or both of two regulating means 10 and 20, the first being current controlled and the latter being voltage controlled. The current controlled regulator 10 has a carbon pile rheostat 11 connected in series with the field winding of the generator. A solenoid 12 having a core 13 controls the pressure upon the carbon pile rheostat 11 by means of a bell crank lever 14 pivoted at 15. The solenoid core 13 has a projection 16 adapted to engage the end of the lever 14 but is normally out of engagement therewith.

In the position shown in Fig. 1 when the elements of the system are at rest, maximum pressure is exerted on the carbon pile 11 by the weight of the long arm of the bell crank lever 14. When current of a sufficiently large value flows through the solenoid 12, the core 13 is drawn further into the winding and the projection 16 engages the extremity of the lever 14 to relax the pressure on the carbon pile rheostat. A dash pot 17 of any preferred type may be employed for steadying the movement of the solenoid plunger.

The voltage controlled regulator 20 has two carbon pile rheostats 21 and 22 of which the first, 21, is in series with the field winding 7 and with the rheostat 11 of the current control regulator and the second, 22, is in shunt to the field winding. The magnet 23, having a shunt winding 24, is adapted to vary the pressure upon these carbon pile rheostats 21 and 22. This is accomplished by means of an armature 25 which is mounted on a lever 26. The lever 26 is pivoted at a point 27 and mechanical connections to the rheostats are made on opposite sides of the pivot point. A spring 28, the tension of which may be adjusted, is constructed to place the rheostat 21 normally under pressure and to relax completely the pressure on rheostat 22. A dash pot 29 may be employed to steady the movement of the lever 26. The magnet 23 is made in horseshoe form, but a large reluctance is inserted in the magnetic circuit to prevent the magnet from exerting a control over the armature 25. The armature 25 is wedge-shaped and the cores of the magnet are cut away so as to allow a rather extensive range of movement of the armature. A second armature 30 is also provided. This armature when attracted reduces the reluctance of the magnetic circuit to such an extent that the magnet is enabled to exercise a control over the armature 25 and thus operate the rheostats. The armature 30 is mounted on the statically balanced lever 31 and may be held under the tension of the spring 32 against a stop 33 to adjust the force of attraction which the magnet must exert to bring the armature 30 against the ends of the poles. This armature 30 acts as a prompting or sensitizing means for the electromagnet 23 to render it capable of controlling the armature 25 upon the attainment of a predetermined voltage across the mains 5—6.

When the system is at rest the parts are in the position shown in Fig. 1. A maximum pressure is exerted upon the rheostats 11 and 21 to decrease to a minimum their resistance. The resistance of carbon pile 22 is a maximum at this time so that very little current is shunted around the field winding 7. As the armature 1 accelerates the machine builds up as a shunt wound generator until the proper charging voltage is attained. At this point the automatic switch 4 is closed by means of a shunt winding, not shown, and the generator is connected to the battery and the lamps. As normal charging current flows through the solenoid 12 the plunger 13 will be raised to bring the projection 16 in contact with the bell crank 14. Any tendency toward excessive current tends to raise the bell crank lever and thereby causes an increase in the resistance of the carbon pile 11 and a diminution of current through the field winding 7. The voltage controlled regulating means 20 is inactive at this time as the voltage is not great enough to cause the magnet 23 to raise the armature 30. Current flows through the storage battery 2 at a uniform rate regardless of the speed of the armature 1 until the voltage relay 20 becomes operative. As charging proceeds, the counter electromotive force of the battery will rise and when a value is reached above which it is not desired to charge the battery, the electromagnet 23 will be sufficiently energized to attract the armature 30 against the pole pieces. The reluctance of the magnetic circuit is thereby so greatly decreased that the electromagnet is enabled to move the lever 26 against the tension of the spring 28 to change the resistance of the carbon piles 21 and 22. Attraction of the armature 25 causes an increase of pressure on the carbon pile 22 and a decrease of pressure on the carbon pile 21. The action of the carbon pile 21 is to insert a greater resistance in the circuit of the field winding 7 and the action of the carbon pile 22 is to partially short-circuit the field winding 7 to a degree depending upon the pressure exerted. By this means the excitation of the generator field is decreased and consequently the current flowing through the battery is decreased. As the counter-electro-motive force of the battery 2 rises to a slightly higher point the charging current is so greatly diminished by the action of the regulator 20 that the regulator 10 is rendered inoperative. Current through the solenoid 12 is insufficient at this time to retain the core 13 in the raised position and it drops out of contact with the lever 14. The regulating means 10 thus becomes inactive leaving the regulation under the sole control of the regulating means 20 which is preferably so adjusted as to hold the generator voltage at a value which will cause the battery to float across the line. One advantage obtained by using the voltage relay 20 just described is that after a certain predetermined voltage, as for instance, the maximum charging voltage, is attained across the charging mains 5 and 6 and the armature 30 has been attracted, the magnetic reluctance of the relay 20 will be so reduced that it will thereafter regulate to maintain a lower voltage which may be approximately equal to the floating voltage of the battery. This standard may be maintained until the generator voltage is reduced to a value to permit the withdrawal of the armature 30 by the spring 32.

If desired the adjustment of the regulator 20 may be made such that a taper charge may be imparted to the battery.

Each of the regulating means 10—20 has sufficient capacity to secure complete regulation of the generator voltage while it is in control. The current controlled regulating means first assumes control and causes the maximum desired current to flow until a predetermined voltage on the system is reached. The voltage controlled means 20 then assumes control and renders the current control means inactive and prevents further charging of the battery. This same principle of control may be used in any system containing a counter-electro-motive force device and is not limited to battery charging systems.

It can be seen from the above that a very efficient system of regulation has been provided. The voltage controlled means is capable of exact adjustment and is very sensitive. This is especially desirable as the resistance of the storage battery is very low and slight variations in the voltage will cause great differences in the amount of current flowing through the battery. Both of the controlling means are normally inactive and become active only when regulation is necessary. This allows the generator to build up quickly and to furnish maximum charging current practically at cut-in voltage.

Although the invention has been described with reference to the details of a particular embodiment, it is not thereby intended to limit the invention, as the same is capable of various embodiments and numerous modifications, all of which are within the scope of the invention.

What I claim as new and desire to secure by Letters Patent of the United States is:

1. In a system containing a generator having a field winding, a variable resistance in series with said field winding, current controlled means governing said variable resistance, said current controlled means including a normally disconnected mechanical connection adapted to be connected by a predetermined movement of the parts, whereby said current means is unresponsive to current less than a predetermined value and responsive to current above said value, a second variable resistance in series with said field winding, voltage controlled means controlling said second variable resistance, said voltage controlled means being unresponsive to voltage less than a predetermined value and means to render said voltage-controlled means effective for operation at a value less than said predetermined value.

2. In a system containing a generator having a field winding, a variable resistance in series with said field winding, current controlled means governing said variable resistance, said current controlled means being unresponsive to current less than a predetermined value, a second variable resistance in series with said field winding, voltage controlled means controlling said second variable resistance, said voltage controlled means being unresponsive to voltage less than a predetermined value, and means to render said voltage controlled means effective for operation at a value less than said predetermined value.

3. In a system of the class described having a counter-electro-motive force device, a variable speed generator having a field winding, a variable resistance in series with said field winding, a solenoid for varying said resistance, said solenoid having a winding in series with said generator, a second variable resistance in series with said field winding, a third variable resistance in shunt of said field winding, a voltage controlled means for simultaneously varying said second and third resistance, said voltage controlled means being normally insensitive up to a predetermined voltage value for varying said resistances and means to render said voltage controlled means effective for operation at a value less than said predetermined value.

4. In a system of the class described, a counter-electro-motive force device, a generator having a field winding, a variable resistance, a current controlled means unresponsive to current less than a predetermined value for varying said resistance, a second resistance in series with said field winding and a third resistance in shunt of said field winding, a voltage controlled means being normally insensitive up to a predetermined voltage value for varying said resistances, and means to render said voltage controlled means effective to vary said second and third resistances at a value less than said predetermined value.

5. In a system combining a generator having a field winding, a variable resistance in series with said field winding, current controlled means governing said variable resistance, said current controlled means including a normally disconnected mechanical connection adapted to be connected by a predetermined movement of the parts whereby said current means is unresponsive to current less than a predetermined value and responsive to current above said value, a second variable resistance in series with said field winding, voltage controlled means controlling said second variable resistance, said voltage controlled means being provided with means for varying the standard of operation thereof upon the attainment of a predetermined voltage.

In witness whereof, I have hereunto subscribed my name in the presence of two witnesses.

WILLIAM L. BLISS.

Witnesses:
  WM. A. TURBAYNE,
  F. H. ZELLHOEFER.